United States Patent
Sigmund et al.

(10) Patent No.: US 10,160,870 B2
(45) Date of Patent: Dec. 25, 2018

(54) DURABLE AND SCALABLE SUPERHYDROPHOBIC PAINT

(71) Applicant: University of Florida Research Foundation, Inc., Gainesville, FL (US)

(72) Inventors: Wolfgang M. Sigmund, Gainesville, FL (US); Yung-Chieh Hung, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 0 days.

(21) Appl. No.: 15/343,292

(22) Filed: Nov. 4, 2016

(65) Prior Publication Data

US 2017/0121530 A1 May 4, 2017

Related U.S. Application Data

(60) Provisional application No. 62/270,265, filed on Dec. 21, 2015, provisional application No. 62/250,776, filed on Nov. 4, 2015.

(51) Int. Cl.
| | | |
|---|---|---|
| *C09D 7/61* | (2018.01) |
| *C09D 7/12* | (2006.01) |
| *C09D 127/16* | (2006.01) |
| *C09D 5/16* | (2006.01) |
| *C09D 7/62* | (2018.01) |
| *C08K 3/36* | (2006.01) |
| *C08K 9/06* | (2006.01) |
| *C08K 3/22* | (2006.01) |
| *C09D 7/40* | (2018.01) |

(52) U.S. Cl.
CPC ......... *C09D 7/1216* (2013.01); *C09D 5/1681* (2013.01); *C09D 7/61* (2018.01); *C09D 7/62* (2018.01); *C09D 127/16* (2013.01); *C08K 3/36* (2013.01); *C08K 9/06* (2013.01); *C08K 2003/2227* (2013.01); *C08K 2003/2241* (2013.01); *C09D 7/67* (2018.01); *C09D 7/68* (2018.01); *C09D 7/69* (2018.01)

(58) Field of Classification Search
None
See application file for complete search history.

(56) References Cited

U.S. PATENT DOCUMENTS

| | | | | |
|---|---|---|---|---|
| 5,322,557 A | * | 6/1994 | Inomata | C07F 7/182 106/287.13 |
| 5,714,277 A | * | 2/1998 | Kawakami | H01M 2/1686 429/129 |
| 5,916,643 A | * | 6/1999 | Spain | B05D 1/286 428/31 |
| 6,723,439 B2 | * | 4/2004 | Amidaiji | C08K 3/36 427/387 |
| 8,202,614 B2 | | 6/2012 | Koene et al. | |
| 8,309,181 B2 | * | 11/2012 | Ishizuka | B05D 7/24 427/379 |
| 9,056,987 B2 | | 6/2015 | Sunder et al. | |
| 9,067,821 B2 | | 6/2015 | Bleecher et al. | |
| 2006/0029808 A1 | | 2/2006 | Zhai et al. | |
| 2008/0015298 A1 | * | 1/2008 | Xiong | C08K 3/22 524/432 |
| 2008/0153963 A1 | * | 6/2008 | Baran | C08K 3/32 524/414 |
| 2008/0286556 A1 | | 11/2008 | D'urso et al. | |
| 2014/0090578 A1 | | 4/2014 | Simpson et al. | |

FOREIGN PATENT DOCUMENTS

| | | |
|---|---|---|
| CN | 102515656 | 6/2012 |
| JP | H10273617 | * 10/1998 |

OTHER PUBLICATIONS

Translation of JP H10273617 (1998) (Year: 1998).*
Ogihara, H. et al., "Simple Method for Preparing Superhydrophobic Paper: Spray-Deposited Hydrophobic Silica Nanparticle Coatings Exhibit High Water-Repellency and Transparency," Langmuir, 2012, pp. 4605-4608, vol. 28.
Il'Darkhanova, F.I. et al., "Development of Paint Coatings with Superhydrophobic Properties," *Protection of Metals and Physical Chemistry of Surfaces*, 2012, pp. 796-802, vol. 48, No. 7.
Simpson, J.T. et al., "Superhydrophobic materials and coatings: a review," *Reports on Progress in Physics*, Jul. 16, 2015, pp. 086501 (1-14), vol. 78, No. 8.

* cited by examiner

*Primary Examiner* — Robert C Boyle
(74) *Attorney, Agent, or Firm* — Timothy H. Van Dyke; Beusse, Wolter, Sanks & Maire PLLC

(57) ABSTRACT

A paint that imparts a superhydrophobic surface on an object is a suspension of hydrophobic particles in a polymeric binder and a plasticizer in a solvent or mixed solvent. The particles are a metal oxide that is surface functionalized with a fluorinated alkyl silane or an alkyl silane. The binder is a mixture of PDVF and PMMA in a ratio of 3:1 to 10:1. The plasticizer is a mixture of triethylphosphate and perfluoro (butyltetrahydrofuran) or other perfluorinated hydrocarbon. Surfaces coated using this paint display contact angles in excess of 150° and resist abrasion.

12 Claims, 3 Drawing Sheets

DURABLE AND SCALABLE SUPERHYDROPHOBIC PAINT

CROSS-REFERENCE TO RELATED APPLICATIONS

This application claims the benefit of U.S. Provisional Application Ser. No. 62/270,265, filed Dec. 21, 2015 and U.S. Provisional Application Ser. No. 62/250,776, filed Nov. 4, 2015, the disclosures of which are hereby incorporated by reference in their entireties, including all figures, tables and drawings.

BACKGROUND OF INVENTION

Superhydrophobicity is defined as a material or surface with a water contact angle greater than 150° and the roll off angle or contact angle hysteresis less than 10°. The coating is hard to wet by water which imparts some compelling properties like self-cleaning and antibio-fouling. Textbooks describe superhydrophobicity as depending the surface roughness or so-called topography. The best published phenomenon is the lotus-effect which means affluent tiny protrusions on the lotus or taro leaf yield a contact angle >150° accompanied by a few degrees of roll-off angle. The second factor important for superhydrophobicity depends on the surface chemistry and typically fluorinated compounds are employed to reduce surface energy to levels for superhydrophobicity. The most crucial criterion for superhydrophobicity is retaining the water droplet in the Cassie-Baxter state where air pockets are trapped under the droplet to reduce the solid-liquid interface. State of the art coatings or micro-scale surfaces possess the drawbacks of poor durability and/or poor optical properties. Therefore, a durable superhydrophobic surface that is scalable for covering a large surface remains a goal.

BRIEF SUMMARY OF THE INVENTION

An embodiment of the invention is directed to a superhydrophobic paint where hydrophobic particles, a polymer binder, and at least one plasticizer are suspended in a solvent. The superhydrophobic paint can be dispersed on a substrate by spraying, rolling, brushing, or spin coating to result in a superhydrophobic coated substrate. The hydrophobic particles can be metal oxide particles, including $SiO_2$ $TiO_2$, or $Al_2O_3$ that are coated with a bound fluorinated alkyl silane or an alkyl silane, such as a covalently bound fluorinated alkyl silane. The metal oxide particles can be 40 nm to 100 μm in diameter. The polymer binder can be a mixture of PDVF and PMMA, which can be used in a ratio of 3:1 to 10:1. The plasticizer can be a mixture of triethyl phosphate and perfluoro(butyltetrahydrofuran). The solvent can be DMF (dimethylformamide), MEK (methyl ethyl ketone), or isophorone. The superhydrophobic paints can be applied to the surface of an object to form a glass, plastic, wood, or metal object with a coating that renders the object's surface superhydrophobic.

DETAILED DISCLOSURE

Figure 1:
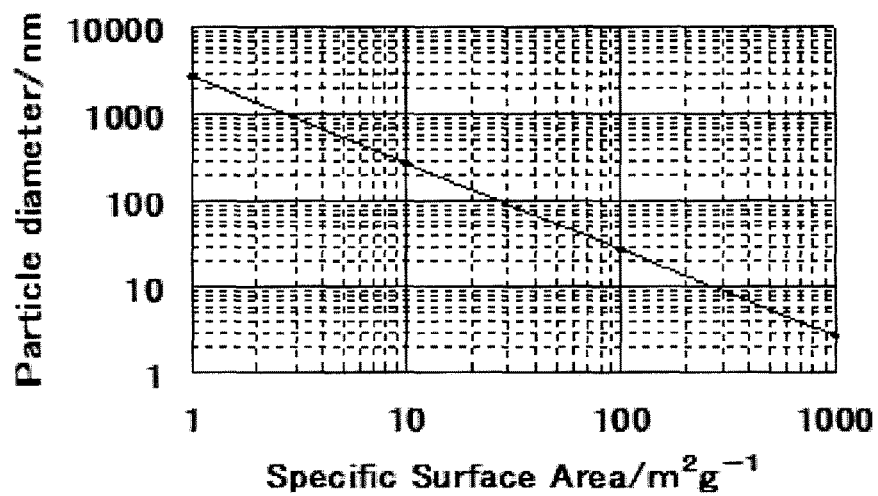
FIG. 1 shows a plot of particle size for the specific surface area of silica particles used to prepare exemplary paints according to an embodiment of the invention.

Embodiments of the invention are directed to a paint comprising: pigments that are functionalized silica particles; binders that are a polymer blend of polymethyl methacrylate (PMMA) and polyvinylidene fluoride (PVDF); and plasticizers that are triethylphosphate and/or perfluorinated compounds. In embodiments of the invention, silica particles of specific surface area of, for example, 35-65 $m^2/g$ are employed as the pigment. As indicated in FIG. 1, the diameters of silica particles are 50 to 110 nm. The silica particles are functionalized by a silane coupling agent, for example, heptadecafluoro-1,1,2,2-tetrahydrodecyltrichlorosilcane, to provide a fluorination alkane bound to the particles. In embodiments of the invention, the binders are a blend of, for example, PMMA and PVDF of molecular weights, for example, 75,000 and 900,000 to 1,300,000, respectively, that are comprised in a solution in a mixed solvent of dimethylformamide and acetone. In embodiments of the invention, the plasticizer is, for example, a mixture of triethylphosphate and perfluoro(butyltetrahydrofuran) or other phosphates and prefluorocarbons. A homogeneous paint is formed by combination of these components.

Other particulate fillers and pigments, in addition or alternative to $SiO_2$, that can be included in the paint are any white metal oxide, including, but not limited to, $TiO_2$, $Al_2O_3$, or other related ceramic powders having particle diameters of 40 nm to 100 μm. The particles can be functionalized with one or more compounds to form a self-assembled monolayer or a surface specific attachment that is fluorinated hydrocarbon or other hydrocarbon that allows the particles to exhibit a low surface energy. In addition to heptadecafluoro-1,1,2,2-tetrahydrodecyltrichlorosilcane, the functionalizing agent can be heptadecafluorodecyl trichlorosilane, heptadecafluoro-1,1,2,2,-tetrahydrodecyltrimethoxysilane, 1H,1H,2H,2H-perfluorodecyltriethoxysilane, other perfluoroalkyl silanes, or a long-chain alkyl silane, such as octadecyltricholosilane. The volume percent pigment particulates in the paint can be 35 to 75%. The binder can be, for example, PDVF and PMMA mixture, and has a PVDF to PMMA ratio of about 5 to 1, about 10 to 1, about 9 to 1, about 8 to 1, about 7 to 1, about 6 to 1, about 4 to 1, about 3 to 1, or any ratio between about 3:1 and 10:1

Figure 4:
FIG. 4 shows a superhydrophobic coating, according to an embodiment of the invention, on a glass substrate.
Figure 5:
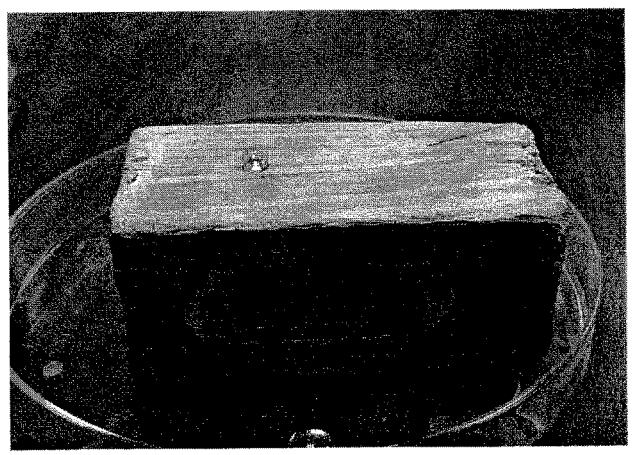
FIG. 5 shows a superhydrophobic coating, according to an embodiment of the invention, on a wood substrate.
Figure 6:
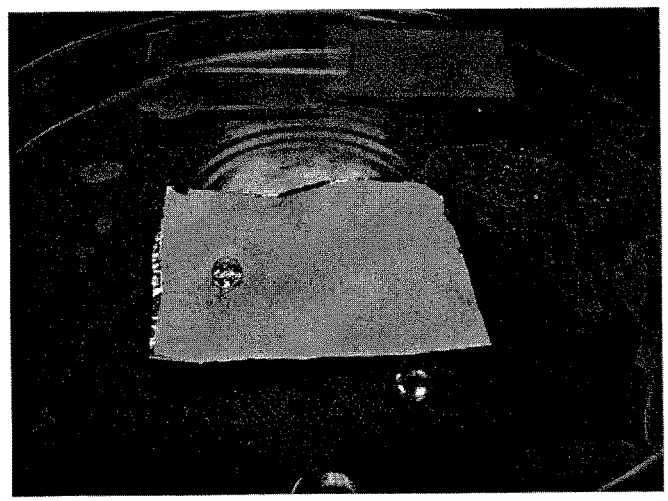
FIG. 6 shows a superhydrophobic coating, according to an embodiment of the invention, on a metal substrate.

According to an embodiment of the invention, the paint can be applied and dried to form a coating on a substrate. The paint can be applied by spraying, rolling, brushing or any other method. The substrate can be any surface, including a glass, plastic, metal, or wood. The superhydrophobic paint can be applied as a top coating on another coating. Different substrates with superhydrophobic coatings are shown in FIGS. 4-6. Superhydrophobicity is displayed for all coatings with these paint formulations, according to an embodiment of the invention. By changing the proportion of particles in the paint, as indicated in Table 1, below, and provided in the Methods and Materials section, below, paint formulations upon drying to a coating form durable superhydrophobic surfaces.

TABLE 1

Coating properties for various paint compositions.

| Formulation | Contact Angle | Observations |
|---|---|---|
| Formulation I, 74% particles | >165° | Particles removed by rubbing |
| Formulation I, 61% particles | >160° | Particles retained after rubbing |
| Formulation I, 39% particles | ≈120° | Particles firmly embedded |
| Formulation II, 64% particles | >165° | |

The paint can be prepared with any solvent that permits the blending of PVDF and PMMA. Solvents that can be employed include, but are not limited to, DMF (dimethylformamide), MEK (methyl ethyl ketone), and isophorone. Additionally, other acrylates and methacrylates can be combined in the paint. The acrylates and methacrylates can be homopolymers or copolymers. For example, a copolymer of methyl methacrylate and ethyl acrylate can be used to form the binder. PMMA can be atactic, syndiotactic, or isotactic.

Methods and Materials

Silica particles, Aerosil Ox 50, were purchased from Evonik Industries. The specific surface area of the particles is 35-65 m$^2$/g. The diameter of silica particles is between 50 to 110 nm. Heptadecafluoro-1,1,2,2-tetrahydrodecyltrichlorosilane was purchased from Gelest Inc. PVDF was obtained from Kynar Hsv 900 with M$_n$ 900,000 to 1,300,000 g/mol and PMMA was obtained from Polyscience Inc. with M$_n$ 75,000. Perfluoro(butyltetrahydrofuran) FC75™, was purchased from ACROS.

Silica particles were dehydrated in an oven at 120° C., cooled and dispersed in chloroform. Subsequently, heptadecafluoro-1,1,2,2-tetrahydrodecyltrichlorosilcane was added to the silica-chloroform dispersion and stirred for one hour. The dispersion was centrifuged and the chloroform decanted. The fluorinated particles were dried at 120° C. on a heating plate.

PVDF was dissolved in DMF at 5 wt % and PMMA was dissolved in acetone at 5 wt %. The 5 wt % PVDF solution and 5 wt % PMMA solutions were mixed at a 5:1 ratio and stirred vigorously for 30 minutes to form a binder solution.

In a first formulation, Formulation I of Table 1, above, a 5 g aliquot of the binder solution, 5 g of 99.8% DMF, 1 g triethylphosphate, and 100 µl of perfluoro(butyltetrahydrofuran) were combined and homogenized using a vortex mixture to form the liquid portion of paint. To equivalent 11.1 g liquid portions of the paint were added 0.88 g, 0.5 g, and 0.2 g of the particles to yield 74, 61, and 39% particle loadings by volume, respectively.

In a second formulation, Formulation II of Table 1, above, a 5 g aliquot of the binder solution, 5 g of MEK, 1 g triethylphosphate, and 100 µl of perfluoro(butyltetrahydrofuran) were combined and homogenized using a vortex mixture to form the liquid portion of paint. To 11.1 g liquid was added 0.6 g of the fluorinated particles to yield 64% particle loading by volume.

UV Resistance Test

UV resistance was tested by observation of the contact angle with time of exposure to UV light. The UV light source was a T8 black light bulb with a wavelength range of about 350 nm to 450 nm.

Figure 2:
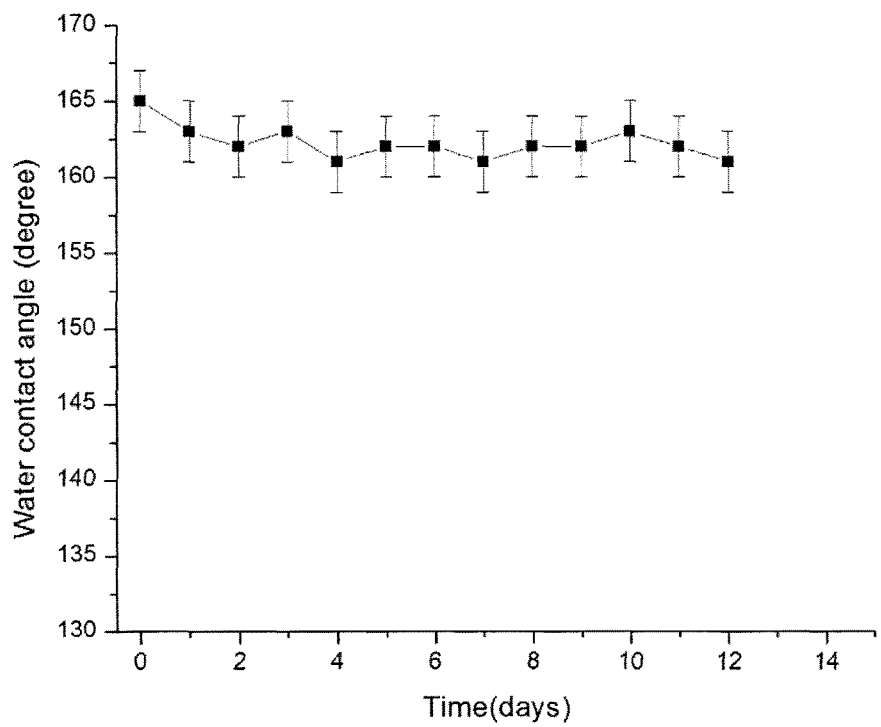
FIG. 2 shows a plot of the water contact angle (CA) of coatings, according to an embodiment of the invention, over time of irradiation with UV light.

As can be seen in FIG. 2, for the first formulation, the water contact angle remained 162°±2° over 12 days of UV-exposure. For the second formulation, the water contact angle was in excess of 165°. Additionally, the sliding angle remained smaller than 5° over that period of time.

Abrasion Test

Figure 3:
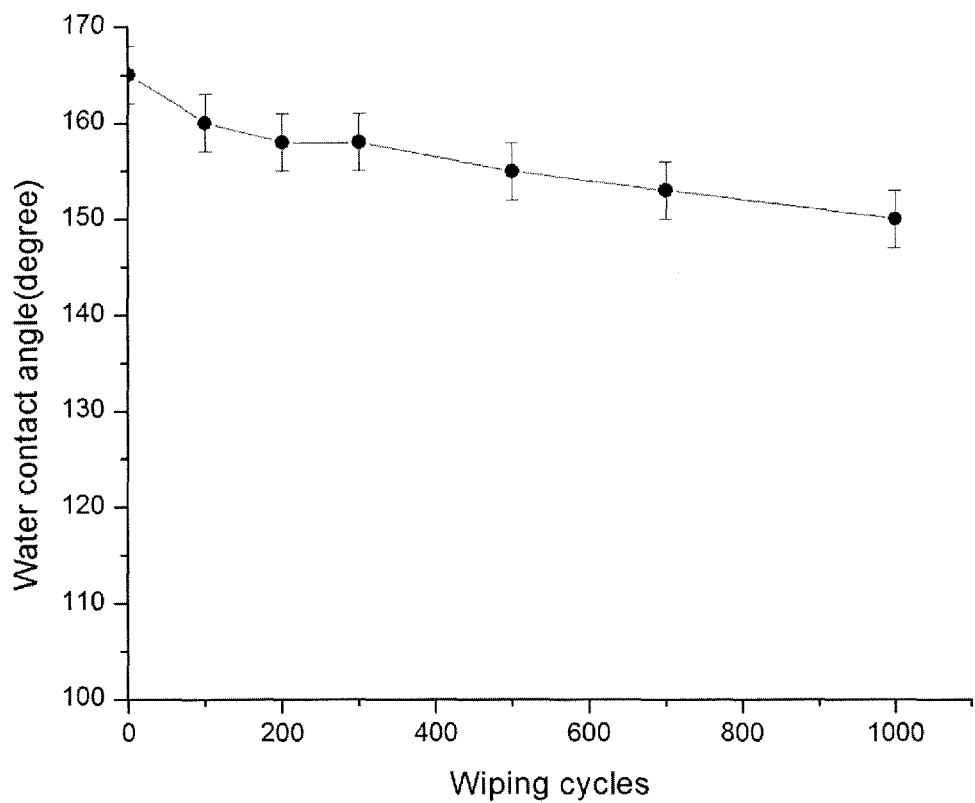
FIG. 3 shows a plot of CA vs abrasion wipes for an abrasion test of a coating according to an embodiment of the invention.

Abrasion testing was carried out with a Taber 5700 Linear Abraser using a windshield wiper purchased from BOSCH GMBH with a loaded mass of 50 g/inch as the abrading surface. The pained substrate was soda-lime glass with the paint applied by spin coating at a rotation speed of 200 rpm. The coating and glass adhere well and the sample displayed superhydrophobicity after 1,000 wipes, as shown in FIG. 3.

It should be understood that the examples and embodiments described herein are for illustrative purposes only and that various modifications or changes in light thereof will be suggested to persons skilled in the art and are to be included within the spirit and purview of this application.

We claim:

1. A superhydrophobic paint, comprising
from 61% to 75% by volume hydrophobic particles,
a polymer binder, and
at least one plasticizer
that are suspended in a solvent,
wherein the hydrophobic particles comprise SiO$_2$, TiO$_2$, or Al$_2$O$_3$, wherein the hydrophobic particles are functionalized with a fluorinated alkyl silane to form a self-assembled monolayer, and
wherein the binder is a mixture of polymethyl methacrylate (PMMA) and polyvinylidene fluoride (PVDF),
wherein the plasticizer is selected from the group consisting of triethylphosphate, perfluorinated compounds, and combinations thereof, and
wherein the solvent is selected from the group consisting of dimethylformamide (DMF), methyl ethyl ketone (MEK), and isophorone,
wherein the paint is dispersible on a substrate by spraying, rolling, brushing, or spin coating.

2. The superhydrophobic paint according to claim 1, wherein the metal oxide particles are 40 nm to 100 µm in diameter.

3. The superhydrophobic paint according to claim 1, wherein the PVDF and PMMA mixture is 3:1 to 10:1.

4. A superhydrophobic paint, comprising hydrophobic particles, a polymer binder, and at least one plasticizer that are suspended in a solvent, wherein the paint is dispersible on a substrate by spraying, rolling, brushing, or spin coating, and wherein the plasticizer is a mixture of triethylphosphate and perfluoro(butyltetrahydrofuran).

5. A superhydrophobic object, comprising a coating formed by deposition of the paint according to claim 1 on an object having a surface comprising glass, plastic, wood, or metal.

6. The superhydrophobic paint according to claim 4, wherein the hydrophobic particles comprise metal oxide particles.

7. The superhydrophobic paint according to claim 6, wherein metal oxide particles comprise SiO$_2$, TiO$_2$, or Al$_2$O$_3$ coated with a fluorinated alkyl silane or an alkyl silane.

8. The superhydrophobic paint according to claim 7, wherein the metal oxide particles are 40 nm to 100 µm in diameter.

9. The superhydrophobic paint according to claim 4, wherein the polymer binder is a mixture of PVDF and PMMA.

10. The superhydrophobic paint according to claim 9, wherein the PVDF and PMMA mixture is 3:1 to 10:1.

11. The superhydrophobic paint according to claim 1, wherein the hydrophobic particles comprise $SiO_2$, and wherein the hydrophobic particles have a specific surface area of 35 to 65 $m^2/g$.

12. The superhydrophobic paint according to claim 1, wherein the PVDF and PMMA mixture is 7:1 to 10:1.

\* \* \* \* \*